United States Patent [19]
Klestadt et al.

[11] Patent Number: 5,333,528
[45] Date of Patent: Aug. 2, 1994

[54] MULTIPLE MISSILE EJECTION SYSTEM

[75] Inventors: Ralph H. Klestadt, Sherman Oaks; Richard R. Finn, Palmdale, both of Calif.

[73] Assignee: Hughes Aircraft Company, Los Angeles, Calif.

[21] Appl. No.: 937,251

[22] Filed: Aug. 28, 1992

[51] Int. Cl.$^5$ .............................................. F41F 3/042
[52] U.S. Cl. ...................................... 89/1.51; 89/1.818
[58] Field of Search ................. 102/351; 89/1.51, 1.8, 89/1.7, 1.701, 1.815, 1.816, 1.818

[56] References Cited

U.S. PATENT DOCUMENTS

| | | | |
|---|---|---|---|
| 3,547,000 | 12/1970 | Haberkorn et al. | 89/1.8 |
| 3,611,865 | 10/1971 | Schallert | 89/1.51 |
| 3,633,509 | 1/1972 | Grandy et al. | 89/1.7 |
| 3,800,656 | 4/1974 | Schnäbele | 89/1.701 |
| 4,406,209 | 9/1983 | Arene et al. | 89/1.701 |
| 4,474,101 | 10/1984 | Boulard et al. | 89/1.51 |
| 4,520,975 | 6/1985 | Blackhurst | 89/1.51 |
| 4,938,115 | 7/1990 | von Maydell | 89/1.51 |
| 4,944,210 | 7/1990 | Flock et al. | 89/1.818 |

Primary Examiner—David H. Brown
Attorney, Agent, or Firm—Charles D. Brown; Randall M. Heald; Wanda K. Denson-Low

[57] ABSTRACT

A multiple missile ejection system (10) by which first and second missiles (14) and (16) are stored in a single launch tube (12). Each missile is ejected by a gas bag. In a particular embodiment, two gas bags are used. The first gas bag (18) is mounted between the first and second missiles (14) and (16) respectively. The second gas bag (20) is mounted between the second missile (16) and an end of the launch tube. When deflated, the first gas bag (18) has a longitudinal aperture (28) through the center thereof which allows for the ejection of the second missile (16) by the second gas bag (20).

7 Claims, 5 Drawing Sheets

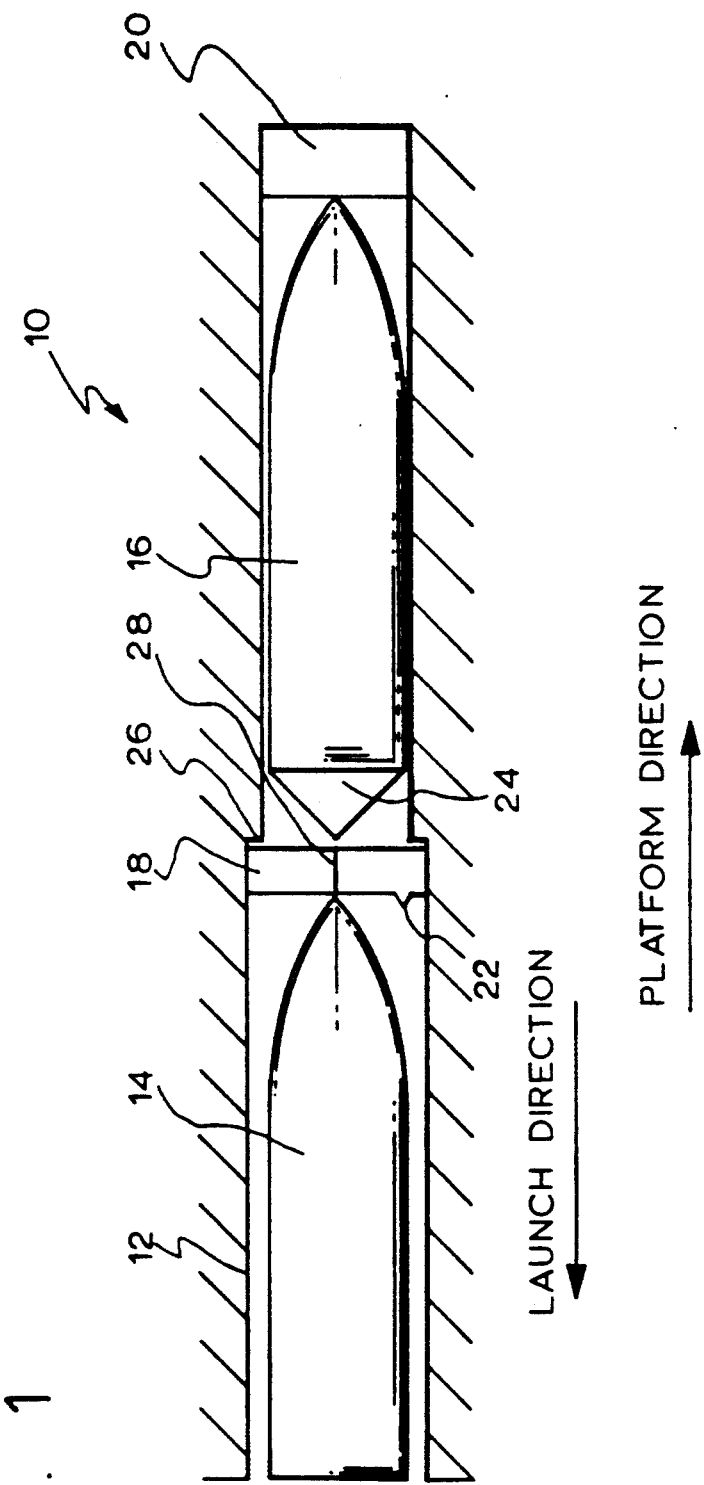
FIG. 1
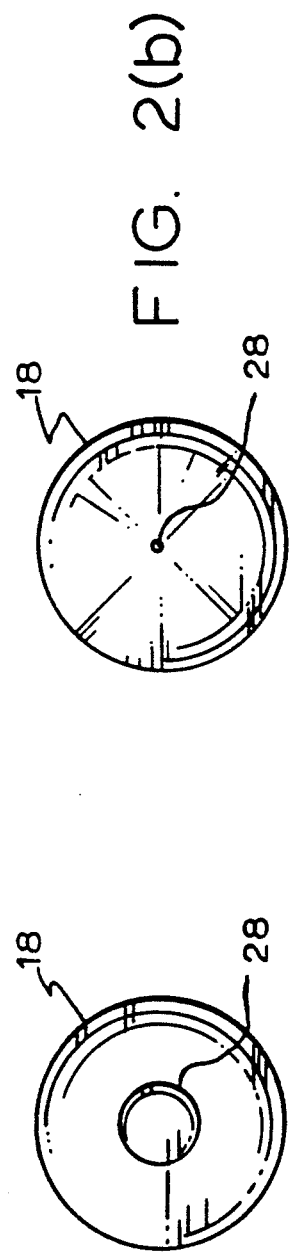
FIG. 2(b)
FIG. 2(a)

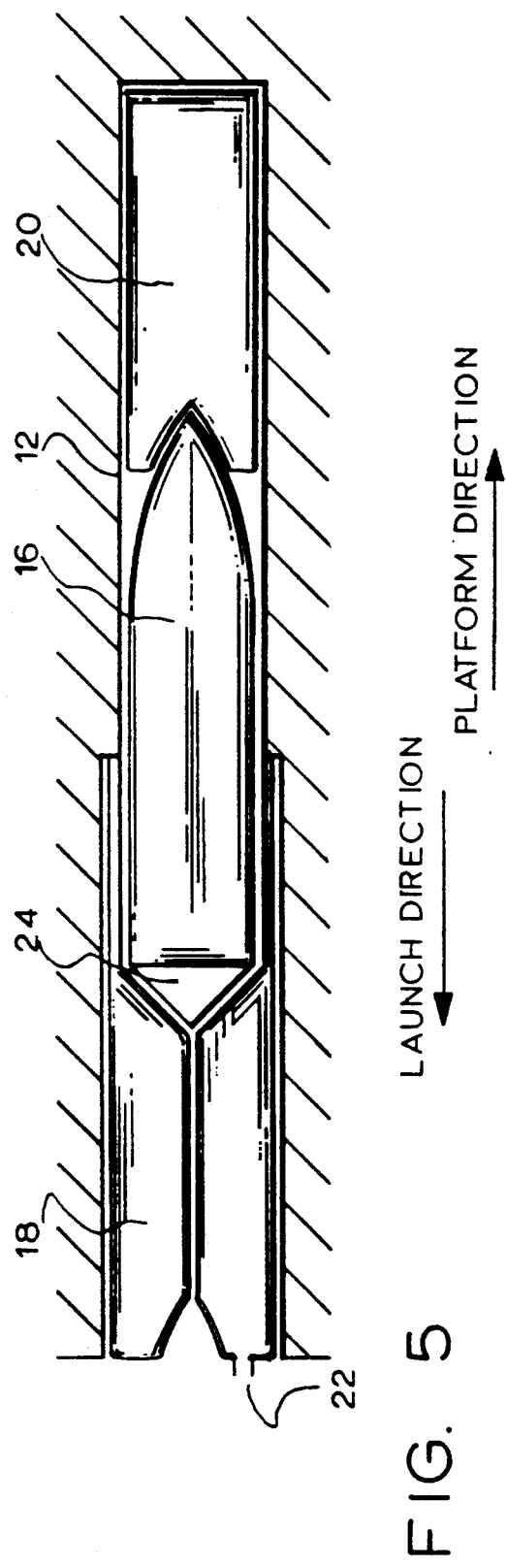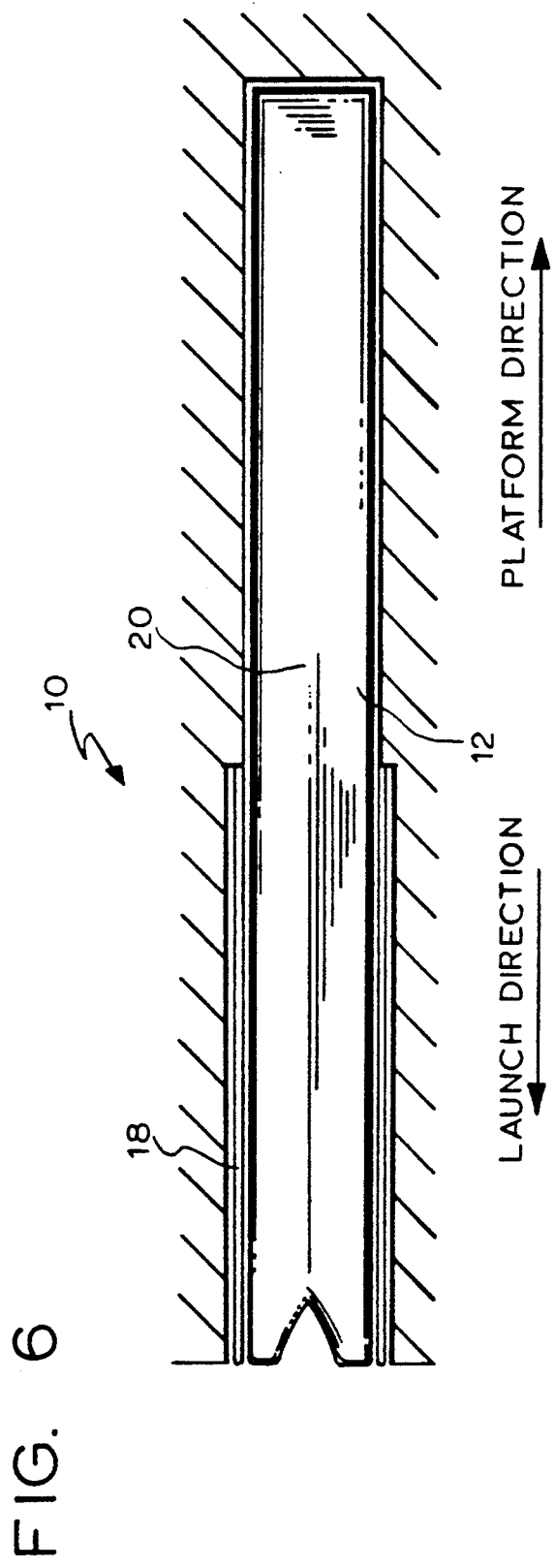
FIG. 5
FIG. 6

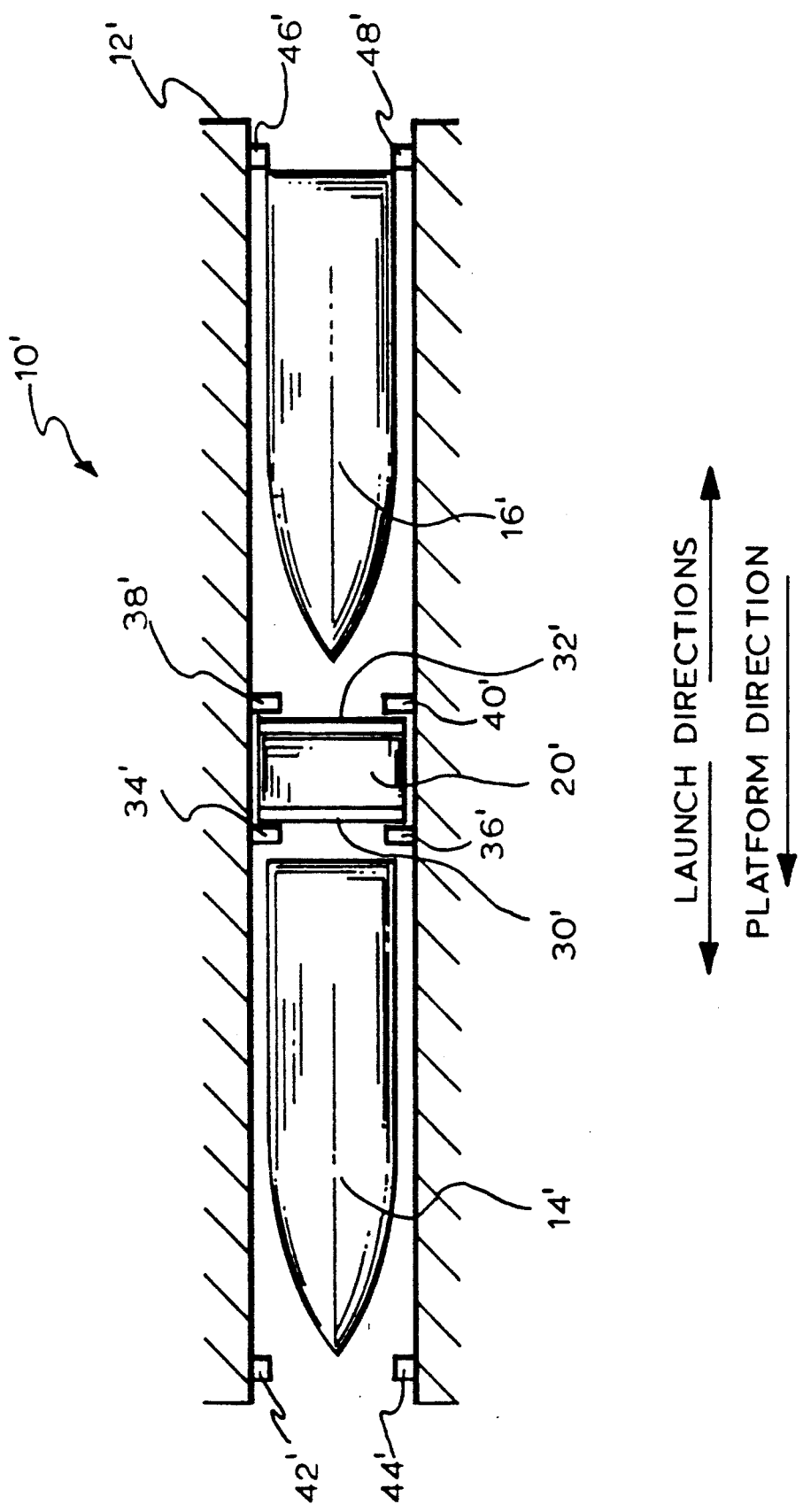

MULTIPLE MISSILE EJECTION SYSTEM

BACKGROUND OF THE INVENTION

1. Field of the Invention

The present invention relates to missile systems. More specifically, the present invention relates to methods and apparatus for launching missiles.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

2. Description of the Related Art

Two important considerations in the design of military aircraft are aerodynamic drag and radar profile. These considerations operate to impose certain constraints on the method and apparatus for launching missiles from such craft. Current missile launch techniques from pods or air vehicles utilize bay doors or a forward port release.

Bay doors are used in applications where the missile is stored internal to the aircraft. However, this option is generally deemed undesirable in that the internal storage of such weapons increases the size of the aircraft. The increased size causes a corresponding increase in the aerodynamic drag, radar profile, weight and both fixed and recurring costs of the vehicle.

As a result, many designers opt to store missile weaponry external to the aircraft in launch tubes for which the forward port release is the launch technique. With this technique, the missile is ejected in a forward direction from the tube relative to the direction of motion of the aircraft. In this case, high aerodynamic drag and high forward radar reflectivity result on the launch aircraft.

In addition, deployment of aerodynamic stabilizing surfaces on the missile must be delayed until the missile clears the tube. Consequently, the missile is aerodynamically unstable during the launch process and its tail surfaces must be rapidly deployed and locked to avoid weapon/aircraft collision or loss of missile control.

Copending U.S. Patent Application entitled technique and apparatus for rearward launch of a missile, Ser. No. 07/929,356, filed Aug. 14, 1992 by H. August, discloses a low drag, low profile, low cost rearward missile launch technique which enhances the safe separation of the missile from the aircraft as well as the survivability of the aircraft. In accordance with the August teaching, each missile is launched from the rear of a single tube attached to the aircraft. However, a certain degree of hardware overhead is associated with each missile. The overhead is attributable to such factors as the weight of the launch tube, the attachment hardware required on the launch tube and on the aircraft, and the number of electrical interfaces required for the missile, by way of example. This overhead limits the efficiency of conventional missile launch systems.

In addition, since each missile is contained in its own tube and is launched in a direction parallel to the longitudinal axis of the aircraft, it remains impractical to locate separate launch tubes coaxially, such that as multiple missiles are launched they must exit one tube and immediately enter a previously emptied tube for transit to the free air.

Thus, there is an ongoing need in the art for an efficient missile launch system by which the overhead associated with each missile is decreased.

SUMMARY OF THE INVENTION

The need in the art is addressed by the present invention which, in a most general sense, provides a multiple missile ejection system. In accordance with the present teachings, first and second missiles are stored in a single launch tube. Each missile is ejected by a gas bag. In a particular embodiment, two gas bags are used. The first gas bag is mounted between the first and second missiles. The second gas bag is mounted between the second missile and an end of the launch tube. When deflated after ejection of the first missile, the first gas bag has a longitudinal aperture through the center thereof which allows for the ejection of the second missile by the second gas bag.

BRIEF DESCRIPTION OF THE DRAWINGS

FIG. 1 is a simplified representation of an illustrative implementation of the multiple missile ejection system of the present invention in a stored configuration.

FIG. 2a is a simplified cross sectional view of a first gas bag of the multiple missile ejection system of the present invention in an unpressurized state.

FIG. 2b is a simplified cross sectional view of the first gas bag of the multiple missile ejection system of the present invention in a pressurized state.

FIG. 5 depicts a partial deflation of the first gas bag and partial inflation of a second gas bag of the missile ejection system of the present invention.

FIG. 6 depicts a full deflation of the first gas bag and full inflation of the second gas bag of the missile ejection system of the present invention.

FIG. 7 is a simplified representation of an alternative single gas bag implementation of the multiple missile ejection system of the present invention in a stored configuration.

DESCRIPTION OF THE INVENTION

Figure 3:
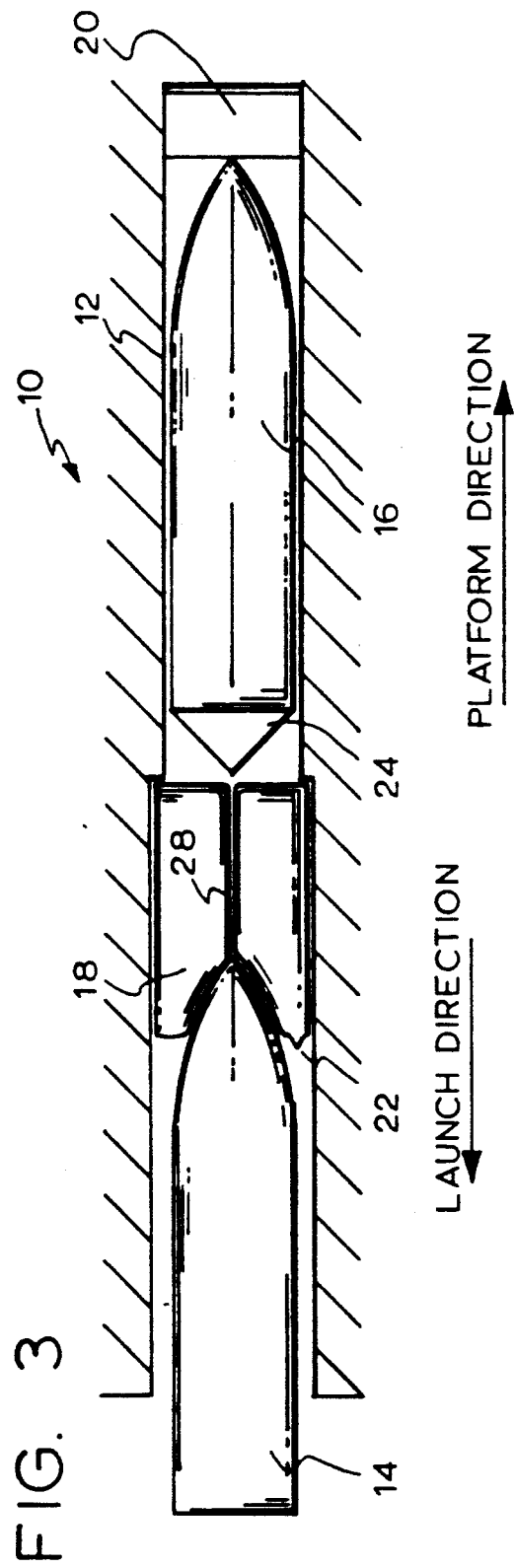
FIG. 3 depicts a partial inflation of the first gas bag of the missile ejection system of the present invention.

Illustrative embodiments and exemplary applications will now be described with reference to the accompanying drawings to disclose the advantageous teachings of the present invention.

FIG. 1 is a simplified representation of an illustrative implementation of the multiple missile ejection system 10 of the present invention in a stored configuration. The system 10 includes an open-ended launch tube 12 constructed to store and interface with a first missile 14, a second missile 16 and first and second gas bags 18 and 20 respectively. The launch tube 12 is otherwise of conventional construction. The attachment and interface mechanisms (not shown) are of conventional design and construction as will be appreciated by those skilled in the art. Each round is mounted for rearward ejection in accordance with the teachings of the above-identified patent to H. August, entitled technique and apparatus for rearward launch of a missile, which are incorporated herein by reference. The first missile 14 is mounted in the open aft end of the launch tube 12. The second missile 16 is mounted in the closed fore end of the launch tube 12.

The first gas bag 18 is mounted between the first and second missiles and is bonded to the walls of the launch tube 12. The first gas bag 18 is restrained against forward movement by an annular surface 26. The annular surface 26 is provided by a smaller diameter of the launch tube of the fore chamber in which the second missile 16 is stored. The first gas bag may also be restrained by an annular ring or other suitable mechanism.

The first gas bag 18 is constructed to provide a pressure vent 22 and an axial aperture 28. The first and second gas bags are otherwise of conventional gas bag construction, e.g., a high-strength pressurizable fabric such as Kevlar.

In the preferred embodiment, the vent 22 (which may be a pressure sensitive valve or an electrical valve responsive to an electrical signal or other suitable type of valve) is normally closed and opens on the creation of overpressure in bag 18. In accordance with the present teachings, the vent 22 is a conventional pressure activated vent and is designed so that sufficient overpressure to open the vent is created when the first gas bag 18 is fully inflated and the second gas bag begins to inflate. Those skilled in the art will appreciate that other vent designs (i.e., electrical) may be used without departing from the present teachings.

The axial aperture 28 is more clearly illustrated in FIGS. 2a and 2b. FIG. 2a is a simplified cross sectional view of the first gas bag 18 of the multiple missile ejection system 10 of the present invention in an unpressurized state. FIG. 2b is a simplified cross sectional view of the first gas bag 18 of the multiple missile ejection system 10 of the present invention in a pressurized state.

Each gas bag is supported within and shaped by the inner walls of the launch tube.

In operation, first, the vent 22 of the first gas bag 18 is initially closed and the gas bag 18 is inflated to eject the first missile 14. Inflation may be achieved by pressure supplied by an onboard gas generator or gas bottle (not shown) as is well known in the gas bag art. As the first gas bag 18 inflates, the aperture 28 closes and the first missile is pushed out of the launch tube 12. This is shown in FIGS. 3 and 4.

Figure 4:
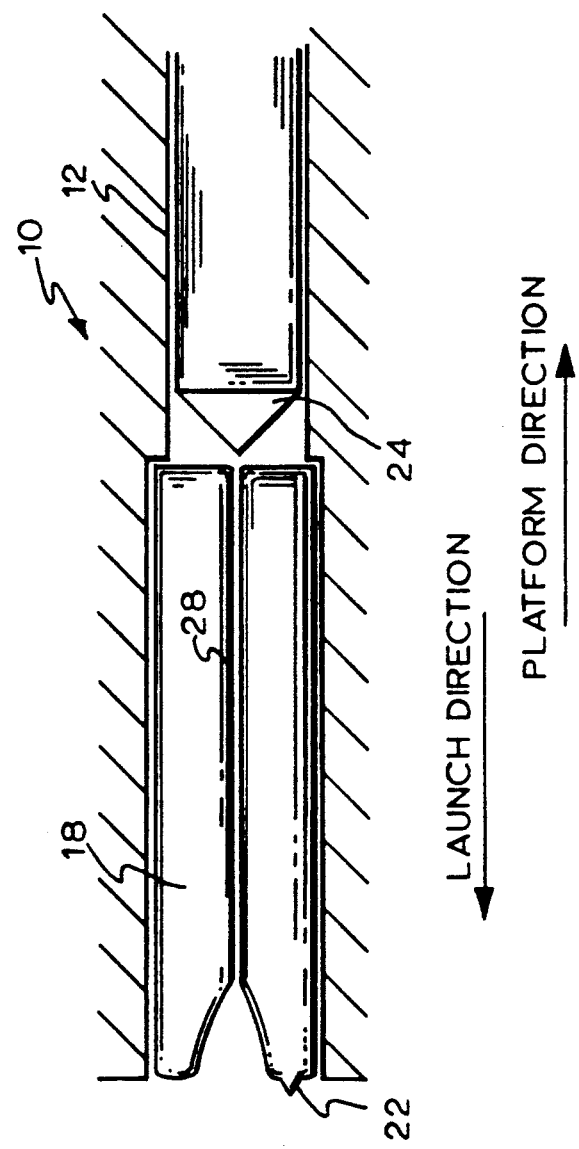
FIG. 4 depicts a full inflation of the first gas bag of the missile ejection system of the present invention.

FIG. 3 depicts a partial inflation of the first gas bag 18 of the missile ejection system 10 of the present invention. FIG. 4 depicts a full inflation of the first gas bag 18 and completed launch of the first missile 14.

In a currently preferred embodiment, launch of the second missile 16 begins with a pressurization of the second gas bag 20. The second gas bag is also bonded to the walls of the launch tube 12. In the illustrative embodiment, pressurization of the second gas bag 20 is achieved in the same manner as the pressurization of the first gas bag 18. Pressurization of the second gas bag 20 causes the vent 22 of the first gas bag 18 to open either through increased pressure in gas bag 18 due to the impingement of missile 16 or by electrical command and a resulting depressurization of the first gas bag. As the first gas bag deflates, the aperture 28 begins to open. The opening of the annulus is facilitated by a rigid cone 24 disposed at the aft end of the second missile 16. The cone may be metal or plastic and may be detached on launch or an integral part of the second missile 16. Forward launch would not require use of the cone as the bag spreading function would be provided by the nose or a conformal nose cover of the missile.

In any event, as the second gas bag 20 inflates, the first gas bag deflates and the second missile 16 begins to move down the launch tube 12. This is shown in FIG. 5 which depicts a partial deflation of the first gas bag 18 and partial inflation of a second gas bag 20. This continues until the second missile 16 is ejected as depicted in FIG. 6. FIG. 6 depicts a full deflation of the first gas bag 18 and full inflation of the second gas bag 20. Thus, first and second missiles are launched from a single launch tube. The fully inflated gas bag prevents contamination of the tube and minimizes the observability of the launch system after the launch sequence.

FIG. 7 is a simplified representation of an alternative single gas bag implementation of the multiple missile ejection system 10' of the present invention in a stored configuration. In this embodiment, the launch tube 12' is open at both ends. A first missile 14' is mounted in the fore end of the launch tube for a forward ejection by the gas bag 20' A second missile 16' is mounted in the launch tube 12' for a rearward ejection by the gas bag 20'.

The single gas bag 20' is designed to fill the entire launch tube 12' on full inflation. The gas bag 20' is positioned between the first and second missiles. The single gas bag 20' is sandwiched between first and second rigid plates 30' and 32'. The plates may be integral with the gas bag 20'. The plates 30' and 32' serve: 1) to facilitate ejection of the missiles 14' and 16', 2) retention of the gas bag 20' within the launch tube 12' after inflation, and 3) to minimize radar reflections from an otherwise open end of the launch tube 12'.

In operation, ejection of the first missile is achieved by retraction of retaining pins 34' and 36' which serve to restrain the gas bag against motion in the fore direction during the option of a first ejection of the second missile 16'. As the bag 20' inflates it is restrained against motion in the rearward direction by a second set of pins 38' and 40'. The pins 34', 36', 38' and 40' may be an annular ring or other suitable mechanism.

The bag 20' is pressurized until the first missile 14' is ejected. At this point, the bag is partially inflated and restrained within the launch tube 12' by a first set of end pins 42' and 44'. The end pins 42' and 44' may be replaced by annular ring. The end pins may also be retractable until the first missile is ejected and extended thereafter. The pins may be retracted by solenoids or other suitable arrangement (not shown) as will be appreciated by one skilled in the art.

In any event, the end pins serve to retain the gas bag during the ejection of the second missile 16' which is achieved in substantially the same manner as the ejection of the first missile. After the ejection of the second missile, the gas bag 20' fills the launch tube 12'.

FIGS. 8a–d illustrate the operation of a second alternative implementation of the multiple missile ejection system of the present invention wherein each missile is loaded into a single tube and ejected by a single gas bag.

Figure 8A:
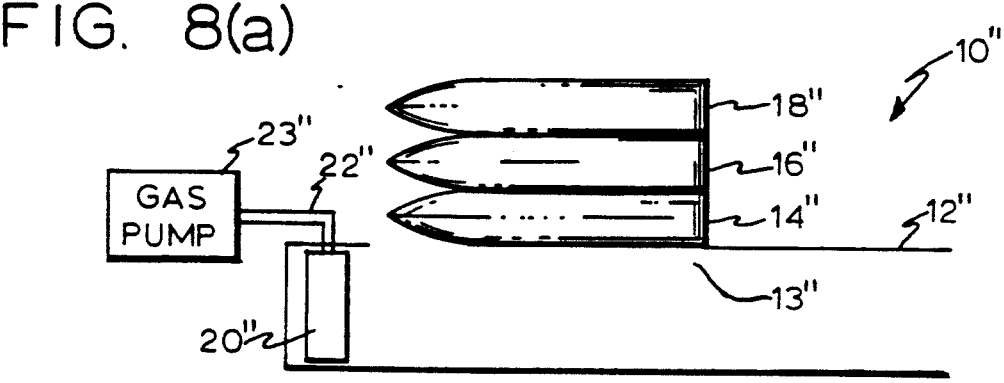
FIGS. 8a–d illustrate the operation of a second alternative implementation of the multiple missile ejection system of the present invention wherein each missile is loaded into a single tube and ejected by a single gas bag.
Figure 8B:
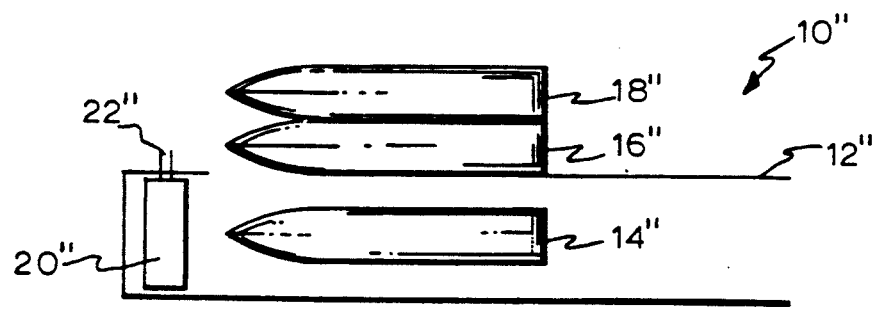
Figure 8C:
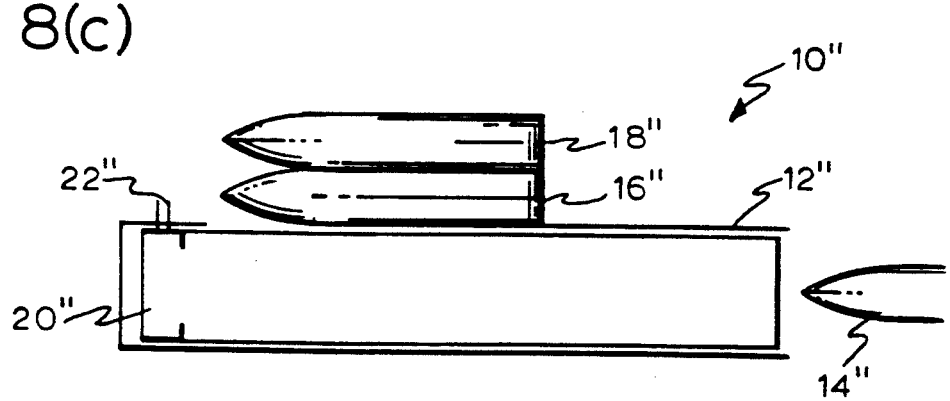

' As shown in FIG. 8a, in this implementation, the launch tube 12" is open ended and adapted to receive missile rounds through an opening 13". Each missile 14", 16" and 18" is ejected rearwardly through the open aft end of the launch tube 18" by the inflation of the gas bag 20". This is depicted in FIGS. 8b and 8c. The gas bag is inflated with a gas input through a tube or vent 22" from a reversible gas pump 23".

Figure 8D:
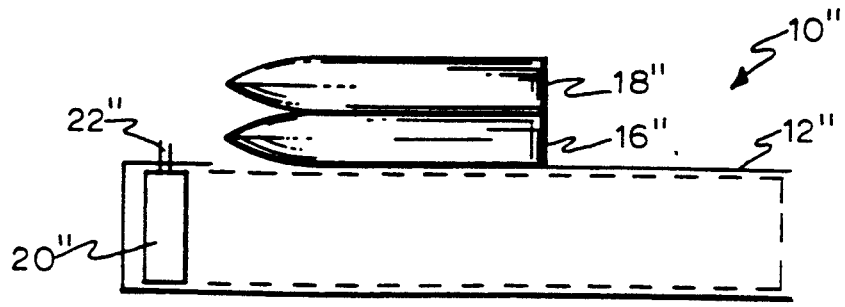

To eject subsequent rounds, the gas bag 20" is evacuated by the pump 23" to a collapsed position as shown in FIG. 8d. The next missile 16" is loaded into the launch tube 12" and the process is repeated.

Thus, the present invention has been described herein with reference to a various embodiments for a particular application. Those having ordinary skill in the art and access to the present teachings will recognize additional modifications applications and embodiments within the scope thereof. For example, the invention is not limited to the use of gas bags to provide motive force for ejection. Other mechanisms may be used as will be appreciated by those skilled in the art.

It is therefore intended by the appended claims to cover any and all such applications, modifications and embodiments within the scope of the present invention.

Accordingly,

What is claimed is:

1. A multiple missile ejection system comprising:
   a launch tube for storing at least a first and a second guided missile and
   gas bag mans for ejecting each of said missiles from said launch tube said gas bag means including at least one gas bag mounted between said first and second missiles and said first missile being mounted for forward ejection from said launch tube and said second missile being mounted for rearward ejection from said launch tube.

2. A multiple missile ejection system comprising:
   a launch tube for storing at least a first and a second missile and
   gas bag mans for ejecting each of said missiles from said launch tube, said gas bag means including first and second gas bags, said first gas bag being mounted between said first and second missiles and said second gas bag being mounted between said second missile and an end of said launch tube said first gas bag being cylindrical in shape and on deflation having a longitudinal aperture through the center thereof.

3. The invention of claim 2 including a cone mounted at the rear of said second missile.

4. The invention of claim 2 wherein said first gas bag includes valve means for deflating said first gas bag.

5. The invention of claim 4 wherein said valve means includes a pressure sensitive valve responsive to an inflation of said second gas bag.

6. The invention of claim 4 wherein said valve means includes an electrical valve responsive to an electrical signal.

7. A multiple missile ejection system comprising:
   a launch tube for receiving and launching multiple missiles;
   a retractable gas bag for ejecting each of said missiles from said launch tube;
   means for inflating said gas bag to launch each of said missiles; and
   means for deflating said gas bag to a retracted position.

* * * * *